US008825709B2

(12) United States Patent
LeMonnier et al.

(10) Patent No.: US 8,825,709 B2
(45) Date of Patent: Sep. 2, 2014

(54) METHODS AND SYSTEMS FOR DISPLAYING BLENDED FAMILY GENEALOGICAL INFORMATION

(75) Inventors: Mark Anthoni LeMonnier, Provo, UT (US); Robert Duffin Wilson, Pleasant Grove, UT (US)

(73) Assignee: Ancestry.com Operations Inc., Provo, UT (US)

( * ) Notice: Subject to any disclaimer, the term of this patent is extended or adjusted under 35 U.S.C. 154(b) by 85 days.

(21) Appl. No.: 13/330,322

(22) Filed: Dec. 19, 2011

(65) Prior Publication Data
US 2013/0159268 A1 Jun. 20, 2013

(51) Int. Cl.
*G06F 17/30* (2006.01)

(52) U.S. Cl.
USPC .......................................... 707/797; 707/805

(58) Field of Classification Search
CPC ................ G06F 17/30961; G06F 17/30327; G06F 17/30864; G06F 17/30595; G06F 17/30554
USPC .......................................... 707/705, 797, 805
See application file for complete search history.

(56) References Cited

U.S. PATENT DOCUMENTS

| | | | | |
|---|---|---|---|---|
| 6,373,488 B1 * | 4/2002 | Gasper et al. | | 345/427 |
| 8,074,185 B2 * | 12/2011 | Sherwood et al. | | 715/854 |
| 8,224,862 B2 * | 7/2012 | Sacks | | 707/797 |
| 8,229,967 B2 * | 7/2012 | Tuttle et al. | | 707/797 |
| 2005/0010371 A1 * | 1/2005 | Merriam-Leith | | 702/20 |
| 2005/0149497 A1 * | 7/2005 | Cookson et al. | | 707/3 |
| 2006/0287876 A1 * | 12/2006 | Jedlicka | | 705/1 |
| 2008/0108027 A1 * | 5/2008 | Sallin | | 434/154 |
| 2008/0172407 A1 * | 7/2008 | Sacks | | 707/102 |
| 2010/0205005 A1 * | 8/2010 | Pritchett et al. | | 705/3 |

OTHER PUBLICATIONS

Seiji Sugiyama et al., "An Event Data Management Method for Displaying Geneaology with a New Function for Direct Descent Family Lines," Oct. 2011, Second International Conference on Culture and Computing, pp. 1-2.*

* cited by examiner

*Primary Examiner* — Robert Beausoliel, Jr.
*Assistant Examiner* — Alexandria Bromell
(74) *Attorney, Agent, or Firm* — Kilpatrick Townsend & Stockton LLP

(57) ABSTRACT

According to the invention, a system for storing and displaying genealogical information is disclosed. The system may include a processor and a storage medium having processor instructions. The instructions may be for receiving information which identifies a first and second parent, receiving information which identifies a first and second child, and receiving an indication that the first child is a biological child of both parents, and that the second child is a biological child of only one parent. The instructions may further be for receiving a first instruction to display a first listing of children, and in response, causing the first child to be displayed in the first listing, but not the second child. The instructions may additionally be for receiving a second instruction to display a second listing of children, and in response, causing both the first child and the second child to be displayed in the second listing.

9 Claims, 5 Drawing Sheets

METHODS AND SYSTEMS FOR DISPLAYING BLENDED FAMILY GENEALOGICAL INFORMATION

BACKGROUND OF THE INVENTION

This invention relates generally to genealogical software. More specifically the invention relates to genealogical software for addressing issues of blended families where step children are present (children who are only biologically related to one of the two parents).

BRIEF DESCRIPTION OF THE INVENTION

In one embodiment, a system for storing and displaying genealogical information is provided. The system may include a processor and a non-transitory storage medium having instructions stored thereon. The instructions may be executable by at least the processor for receiving information which identifies a first parent and a second parent, receiving information which identifies a first child, and receiving a first indication that the first child is a biological child of both the first parent and the second parent. The instructions may also be for receiving information which identifies a second child, and receiving a second indication that second child is a biological child of only one of the first parent or the second parent. The instructions may further be for receiving a first instruction to display a first listing of children, and in response to the first instruction, causing the first child to be displayed in the first listing, but not the second child. The instructions may additionally be for receiving a second instruction to display a second listing of children, and in response to the second instruction, causing both the first child and the second child to be displayed in the second listing.

In another embodiment, a system for displaying genealogical information is provided. The system may include a non-transitory storage medium having instructions stored thereon. The instructions may be executable by at least one computer for receiving information which identifies a first child and receiving information regarding parentage of the first child which indicates that the first child is an offspring of a first parent and not a second parent. The instructions may also be executable for receiving a first instruction to display a listing of common offspring of the first parent and second parent, and in response to the first instruction, not causing the first child to be displayed in the listing of common offspring. The instructions may further be executable for receiving a second instruction to display a listing of children of the first parent, and in response to the second instruction, causing the first child to be displayed in the listing of children of the first parent. The instructions may additionally be for receiving a third instruction to display a listing of children of the second parent, and in response to the third instruction, not causing the first child to be displayed in the listing of children of the second parent. The instructions may moreover be for receiving a fourth instruction to display a listing of children of either parent, and in response to the fourth instruction, causing the first child to be displayed in the listing of children of either parent.

In another embodiment, a method for displaying genealogical information is provided. The method may include displaying a list of children associated with at least one of either a first parent or a second parent. The method may also include displaying an indicator for each child on the list of children. The indicator may be selected from a first symbol, a second symbol, or a third symbol. The first symbol may indicate that a child is biologically related to the first parent. The second symbol may indicate that a child is biologically related to the second parent. The third symbol may indicate that a child is biologically related to both the first parent and the second parent.

BRIEF DESCRIPTION OF THE DRAWINGS

The present invention is described in conjunction with the appended figures.

Figure 1:
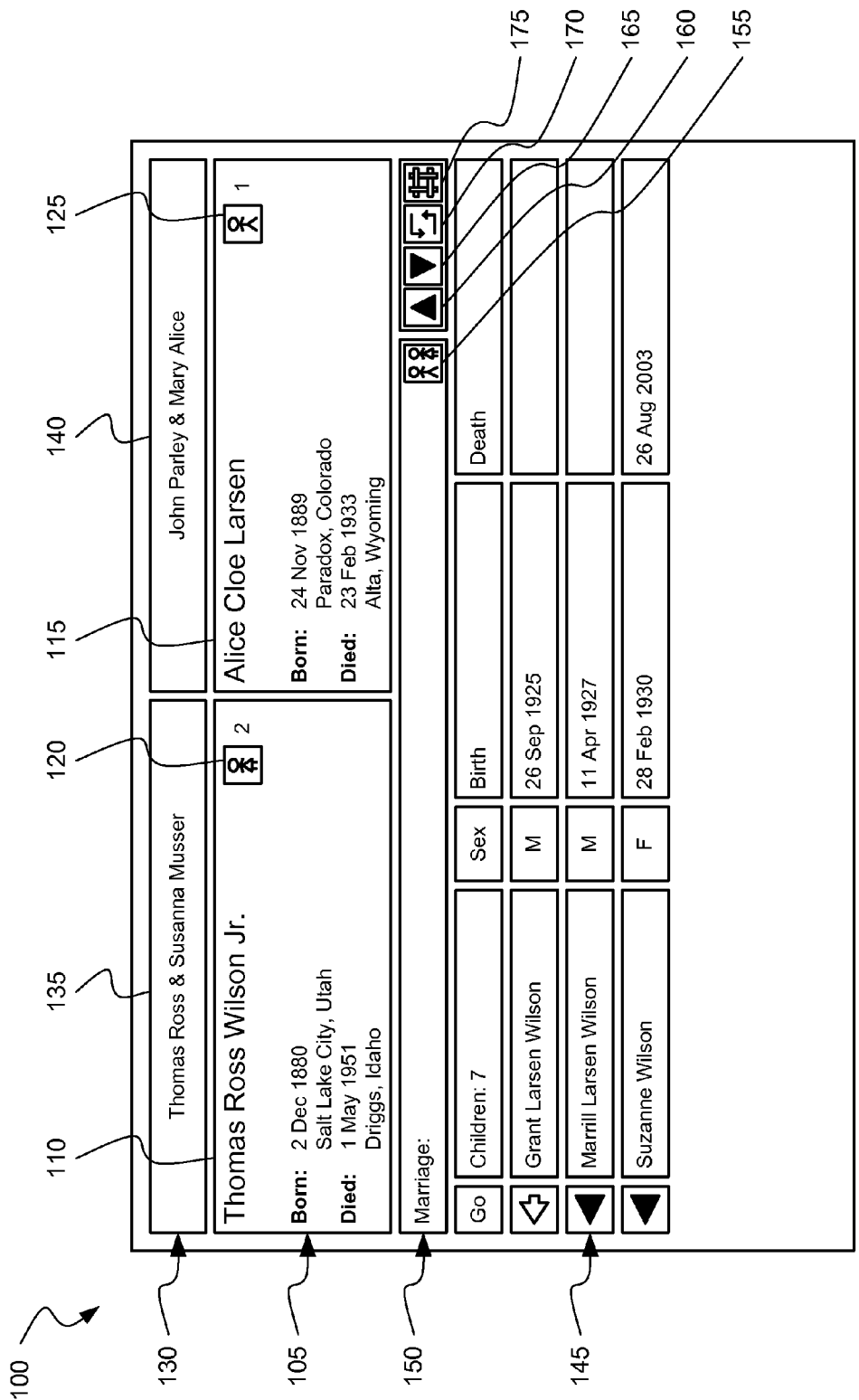
FIG. 1 is a view of a display of one embodiment of the invention showing blended families.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It will be understood that various changes may be made in the function and arrangement of elements without departing from the spirit and scope of the invention as set forth in the appended claims. Merely by way of example, any embodiment described herein may or may not always have every feature discussed with regards to that embodiment, and also may have any particular feature of any other discussed embodiment added thereto.

Specific details are given in the following description to provide a thorough understanding of the embodiments. However, it will be understood by one of ordinary skill in the art that the embodiments may be practiced without these specific details. For example, systems, networks, processes, and other elements in the invention may be shown as components in block diagram form in order not to obscure the embodiments in unnecessary detail. In other instances, well-known processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "storage medium" includes, but is not limited to, portable or fixed storage devices, optical storage devices, wireless channels and various other mediums capable of storing, containing or carrying instruction(s) and/or data. Storage mediums may be transitory or non-transitory. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor, processors, or other machine or machines may perform the necessary tasks.

Turning now to FIG. 1, a display 100 rendered by one embodiment of the invention is shown. In this embodiment, multiple levels of a family are shown. At middle level 105 a spousal pair is displayed. Middle level 105 includes a first parent 110, and a second parent 115. In this embodiment first parent 110 is a father, and second parent 115 is a mother. Middle level 105 may display various information related to each of first parent 110 and second parent 115, including in this example, birth and death dates and locations. Additional icons for each parent in middle level 105 may indicate the number of spouses that parent has had. In this example, first parent 110 is shown having two spouses by indicator 120. Second parent 115 is shown having one spouse by indicator 125.

In some embodiments, more information about first parent 110 or second parent 115 may be obtained by pressing somewhere in the box containing either parent (e.g., with a mouse or other input device). Likewise, pressing the spouse indicators 120, 125 may cause more information to be presented regarding the spouses of first parent 110 or second parent 115.

Above middle level 105, top level 130 is displayed. Top level 130 displays the two parents 135 of first parent 110, and the two parents 140 of second parent 115. In some embodiments, more information about top level 130 parents 135, 140 may be obtained by pressing on the box containing either set of parents 135, 140.

Beneath middle level 105 is lower level 145. Lower level 145 shows the children of first parent 110 and second parent 115. Various details regarding each child may be displayed, including name, sex, birth date, and death date. More information may be obtained regarding any particular child by pressing on the indicator in the 'Go' column.

In this display, only children who are the offspring of both parents 110, 115 are displayed. Thus, display 100 shows the traditional family of parents 110, 115, and does not display step-children of either parent 110, 115 who are only biologically related to one or the other parent 110, 115.

In between middle level 105 and lower level 145 is control bar 150. Control bar 150 may show marriage details of parents 110, 115, and additional information regarding the marriage may be obtained by pressing on marriage button 155. Further, there may be additional buttons to manipulate the display of bottom level 145.

Buttons 160, 165 may allow a user to move selected children up or down in the list of children. By default, lower level 145 may display the children by birth date or other characteristic (i.e., alphabetically, sex, death date, etc.). Button 170 may allow a user to cause the children to be re-sorted by the default methodology. In some embodiments, the button 170 may also cause the sorting of the children to return to the pre-default arrangement (the order as re-arranged by the user). In these or other embodiments, the user re-arranged order may be saved between different views (i.e., traditional, blended with parentage indicators, blended without parentage indicators).

The remaining button on control bar 150 is the blended family display button 175. In the display's current state, when button 175 is not activated, as shown in FIG. 1, the traditional family view is shown, and only children who are biological children of each parent are displayed.

Figure 2:
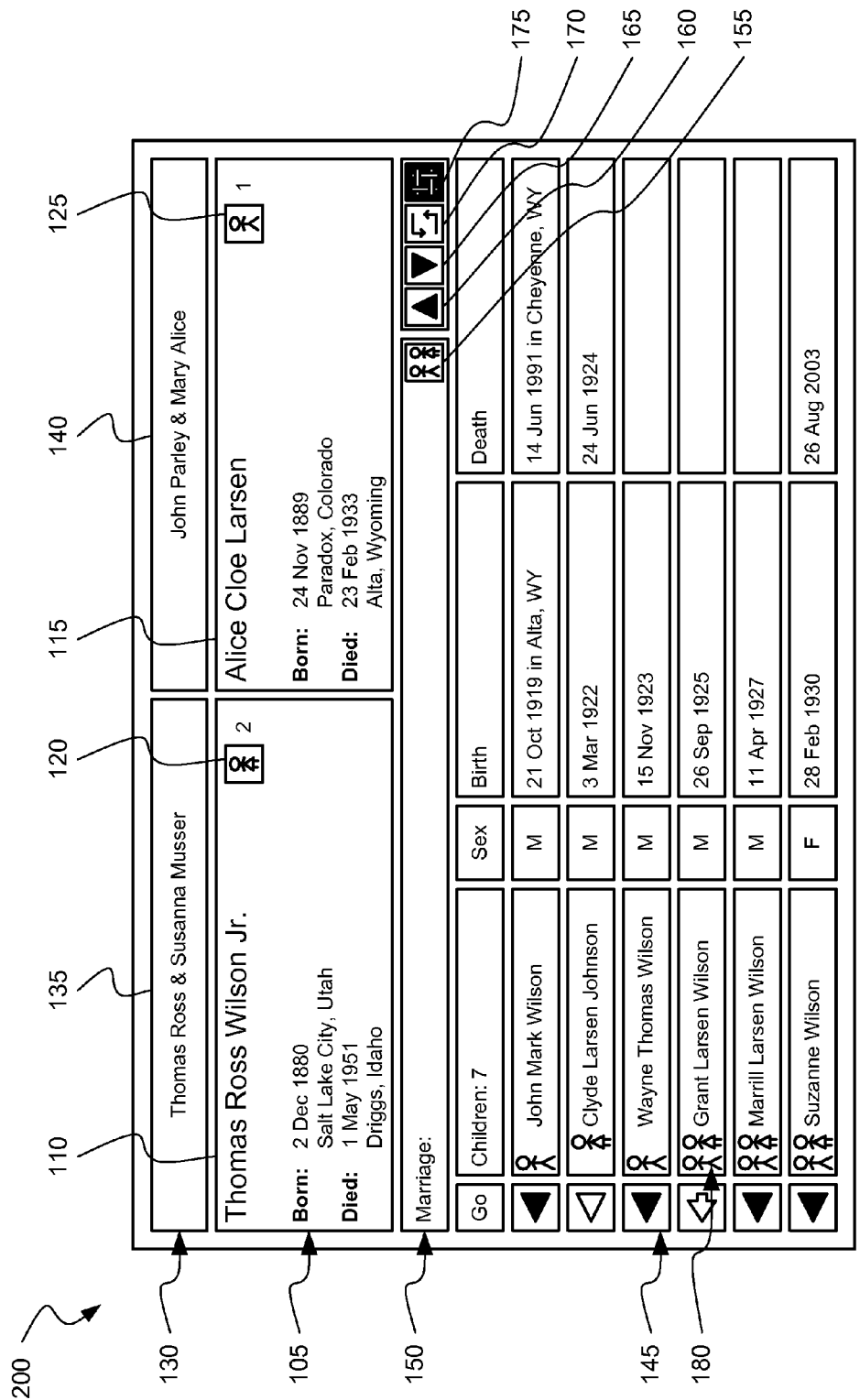
FIG. 2 is a view of the display of FIG. 1 after activation of a blended family display option.

FIG. 2 shows the display of FIG. 1 after blended family display button 175 has been activated. In this view 200, each child listed also includes a parentage indicator 180. In this embodiment, parentage indicator 180 may display a representation of a male if the child is only the biological child of first parent 110, but not second parent 115. Likewise, parentage indicator 180 may display a representation of a female if the child is only the biological child of second parent 115, but not first parent 110. For those children that are biological children of both parents 110, 115, parentage indicator 180 may display a representation of both a male and a female. Note that while in this embodiment male and female representations are used for parentage indicators, any other symbols or indicators may be used in other embodiments.

Children which are not biological children of both parents 110, 115 may be biological children of one of parents 110, 115 as well as one of the other spouses of either parent 110, 115 which is not currently displayed. The selection of an alternative spouse of either parent 110, 115 may cause the spouse shown to change on the display, and the previous "step-child" to be a biological child of the newly displayed spousal pair. Thus, previous to the display of the family information, information related to the identity and parentage of the children may be received for storage in a query-able database of the system, thereby allowing displays as shown in FIGS. 1-3 for any spousal set or child.

Figure 3:
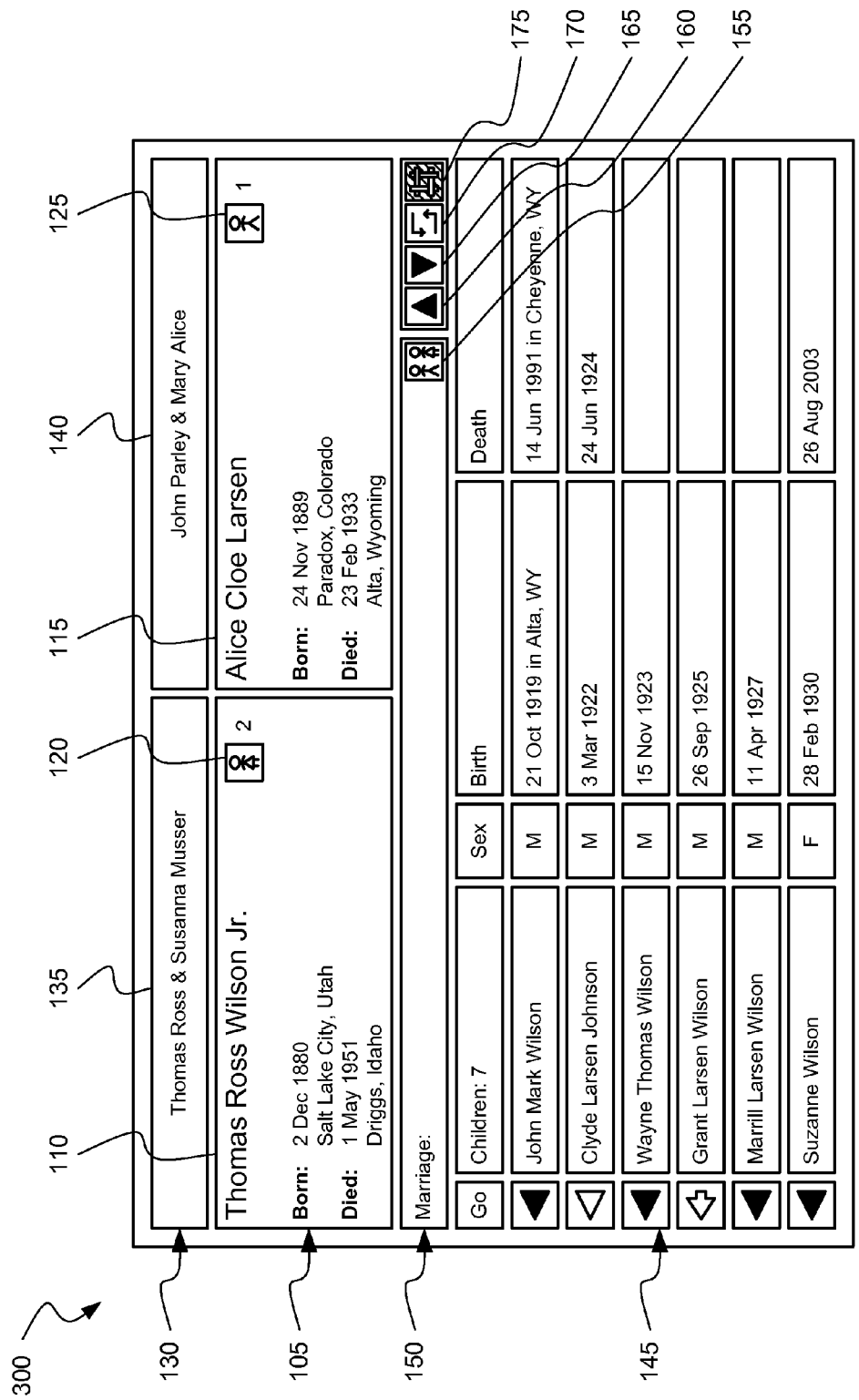
FIG. 3 is a view of the display of FIG. 2 after another activation of a blended family display option.

FIG. 3 shows the display of FIG. 2 after blended family display button 175 has again been activated to a third state. This view 300 is the same as view 200, except the parentage indicators have been removed. Note that in each view 200, 300, where blended family views are shown, a different default arrangement may be used from that employed in the traditional family view 100. Arrows 160, 165 may still be used to allow movement of a selected child in the list.

Figure 4:
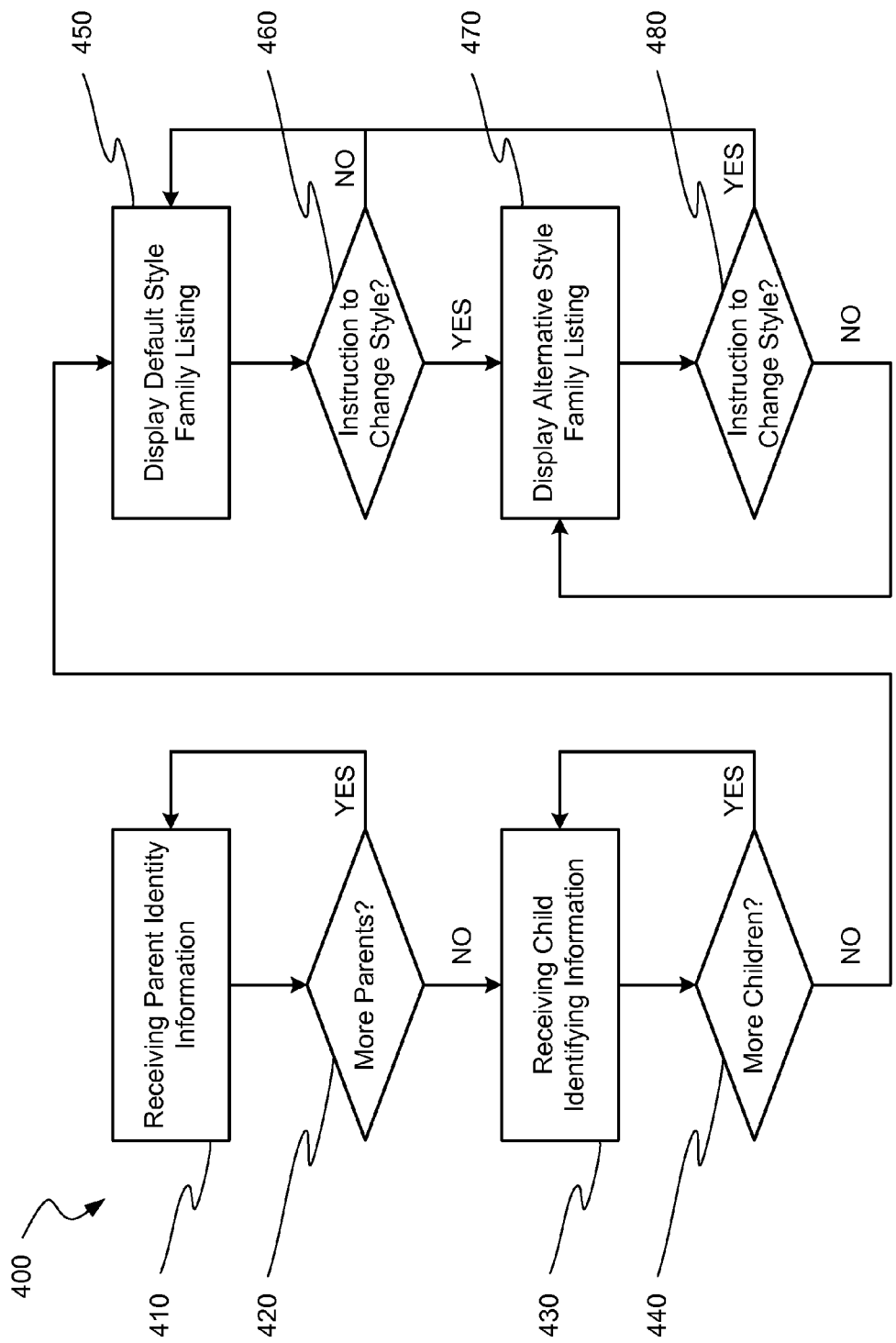
FIG. 4 is a block diagram of a method of the invention for toggling between traditional and blended family views.

FIG. 4 is a block diagram of a method 400 of the invention for toggling between traditional and blended family views. At block 410, information identifying parents is received by the system. At block 420, if more parents are to be received, then block 410 is repeated. This may occur where you have blended families where some children have mixed parentage involving only one of the initial two entered parents. Once all parents are entered, method 400 proceeds to block 430.

At block 430, information identifying children is received. This information includes information regarding which of the entered parents at block 410 are each child's parents. This allows systems of the invention to put together a database of children and their associated parentage information. At block 440, it is determined whether there are additional children to be entered into the system, and block 430 is repeated as often as necessary. Once all children are entered, method 400 proceeds to block 450.

At block 450, a default display of the family may be presented. The default display may be either the traditional family display or the blended family display. The default display may also include having the children sorted in any number of manners. The default display, whether traditional or blended, along with the sort order of the children, may be selectable by the user or set by the system.

At block 460, it is determined whether the user wishes to change the display style. If not, display of the default style continues to occur at block 450. If the user does wish to change the display style, the alternative style is displayed at block 470. At block 480, it is again checked to see if the user wishes to remain on the alternative display, or return to the default display. If not, display of the alternative style continues at block 470. Otherwise, display of the default style occurs at block 450.

Figure 5:
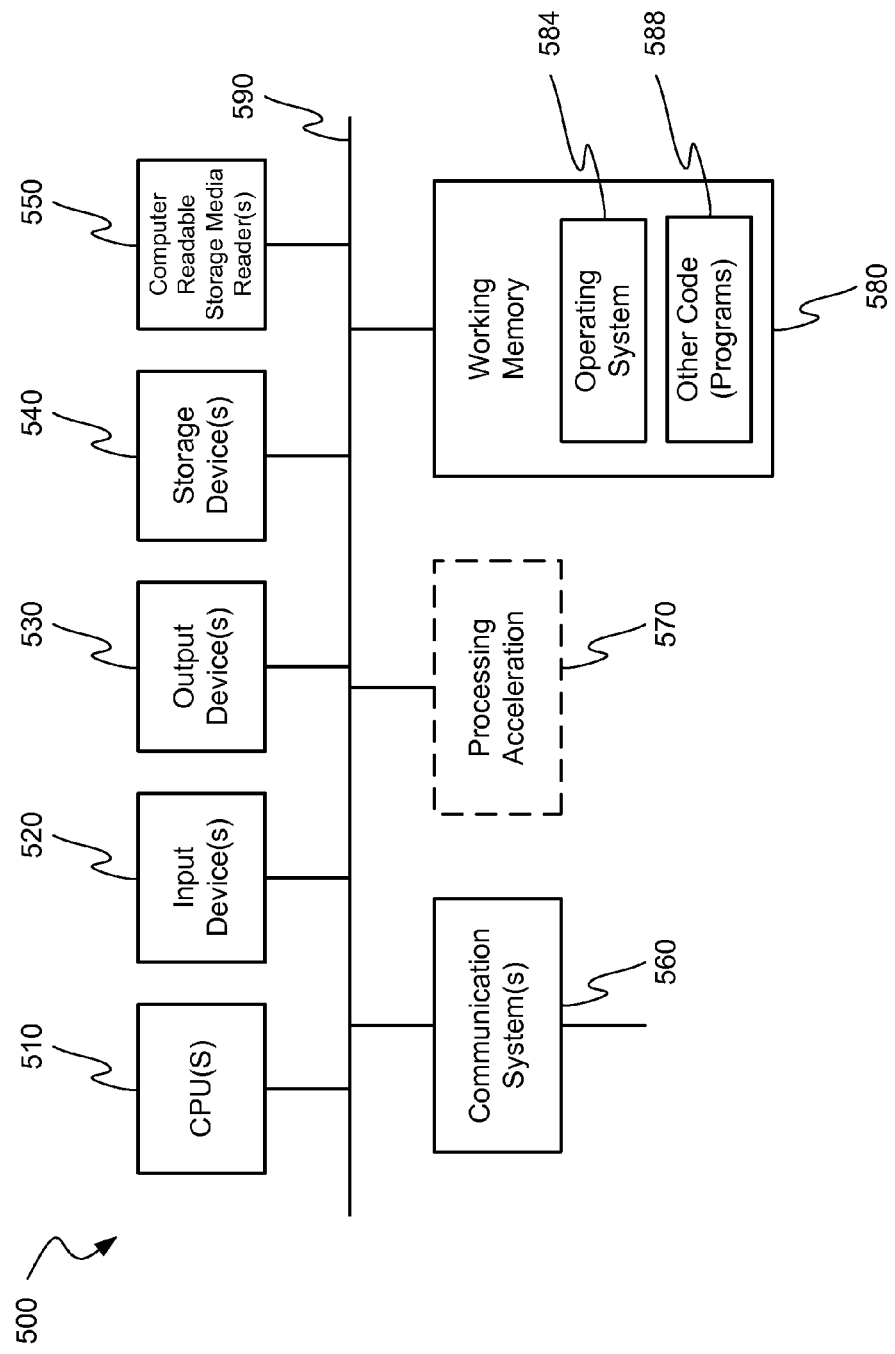
FIG. 5 is a block diagram of an exemplary computer system capable of being used in at least some portion of the apparatuses or systems of the present invention, or implementing at least some portion of the methods of the present invention.

FIG. 5 is a block diagram illustrating an exemplary computer system 500 in which embodiments of the present invention may be implemented. This example illustrates a computer system 500 such as may be used, in whole, in part, or with various modifications, to provide the functions of the above described embodiments. For example, various functions of the display and user interface may be controlled by the computer system 500, including, merely by way of example, receiving child and parent information, sorting child information, changing a selected display type, etc.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of the above described embodiments. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A system for storing and displaying to a user genealogical information for a pair of spousal parents, wherein the system comprises:
   a processor; and
   a non-transitory storage medium having instructions stored thereon, the instructions executable by at least the processor for:
      receiving information which identifies a first parent and a second parent in a spousal pair of parents;
      receiving information which identifies a first child;
      receiving a first indication that the first child is a biological child of both the first parent and the second parent;
      receiving information which identifies a second child;
      receiving a second indication that the second child is a biological child of only one of the first parent or the second parent;
      receiving, in response to a first display selection by a user, a first instruction to display a first listing of children for the first and second parents as a spousal pair, and in response to the first instruction, causing the first child to be displayed in the first listing, but not the second child; and
      receiving, in response to a second display selection by the user, a second instruction to display a second listing of children for the first and second parents as a spousal pair, and in response to the second instruction, causing both the first child and the second child to be displayed in the second listing, wherein the user alternatively displays, based on the first and second selection, a traditional family view with only biological children for both the first and second parent in response to the first selection, and a separate blended family view with biological children of either the first parent or the second parent in response to the second selection.

2. The system for storing and displaying genealogical information of claim 1, wherein the first instruction comprises:
   an instruction to display only children who are biological children of both the first parent and second parent.

3. The system for storing and displaying genealogical information of claim 1, wherein the second instruction comprises:

an instruction to display all children.

4. The system for storing and displaying genealogical information of claim 1, wherein causing the first child to be displayed comprises:
    causing the first child to be displayed with a first indicator.

5. The system for storing and displaying genealogical information of claim 4, wherein:
    the first parent comprises a father;
    the second parent comprises a mother; and
    the first indicator comprises a representation of a male and a female.

6. The system for storing and displaying genealogical information of claim 1, wherein causing both the first child and the second child to be displayed comprises:
    causing the first child to be displayed with a first indicator; and
    causing the second child to be displayed with a second indicator.

7. The system for storing and displaying genealogical information of claim 6, wherein:
    the first parent comprises a father or a mother;
    the second parent comprises the other of the father or mother;
    the first indicator comprises a representation of a male and a female; and
    the second indicator comprises a representation of the male or the female.

8. The system for storing and displaying genealogical information of claim 1, wherein causing both the first child and the second child to be displayed comprises:
    causing the first child and the second child to be displayed in order of birth.

9. The system for storing and displaying genealogical information of claim 1, wherein causing both the first child and the second child to be displayed comprises:
    causing the first child and the second child to be displayed in order of biological relationship to the first parent and second parent, wherein:
        the children who are biological children of both the first parent and the second parent are displayed first;
        the children who are biological children of the first parent but not the second parent are displayed second; and
        the children who are biological children of the second parent but not the first parent are displayed third.

* * * * *